US009163653B2

United States Patent
Liang

(10) Patent No.: US 9,163,653 B2
(45) Date of Patent: Oct. 20, 2015

(54) FIXING MECHANISM

(71) Applicant: Wistron Corporation, New Taipei (TW)

(72) Inventor: Jyun-Shuo Liang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 17 days.

(21) Appl. No.: 14/203,511

(22) Filed: Mar. 10, 2014

(65) Prior Publication Data

US 2015/0176622 A1 Jun. 25, 2015

(30) Foreign Application Priority Data

Dec. 20, 2013 (TW) .............................. 102147562 A

(51) Int. Cl.
*F16B 13/04* (2006.01)
*F16B 19/10* (2006.01)
(52) U.S. Cl.
CPC ..... *F16B 19/1081* (2013.01); *F16B 2019/1018* (2013.01)
(58) Field of Classification Search
CPC ................... F16B 19/1081; F16B 2019/1018; F16B 19/08; F16B 19/12
USPC ...................................... 411/19, 15
See application file for complete search history.

(56) References Cited

U.S. PATENT DOCUMENTS

| | | | | |
|---|---|---|---|---|
| 646,738 A * | 4/1900 | Ingalls | ........................ | 411/339 |
| 2,438,976 A * | 4/1948 | Lautmann | ........................ | 411/19 |
| 3,213,743 A * | 10/1965 | Campbell | ........................ | 411/19 |
| 3,613,495 A * | 10/1971 | Podgursky | ........................ | 411/19 |
| 3,659,320 A * | 5/1972 | Meyer | ........................ | 24/297 |
| 4,084,721 A * | 4/1978 | Perry | ........................ | 220/269 |
| 4,352,589 A * | 10/1982 | Allison et al. | ............. | 403/408.1 |
| 5,346,347 A * | 9/1994 | Barikosky et al. | ............. | 411/19 |
| 5,846,039 A * | 12/1998 | Kirchen | ............. | F16B 19/1054 411/34 |
| 5,846,040 A * | 12/1998 | Ueno | ........................ | 411/45 |
| 5,937,486 A * | 8/1999 | Bockenheimer | ...... | B29C 44/188 24/114.6 |
| 6,206,200 B1 * | 3/2001 | Gilles et al. | ................... | 209/399 |
| 6,345,420 B1 * | 2/2002 | Nabeshima | ........................ | 24/297 |
| 6,634,840 B1 * | 10/2003 | Salmon et al. | ................... | 411/44 |
| 7,033,121 B2 * | 4/2006 | Kirchen | ................ | F16B 19/008 24/453 |
| 2004/0223832 A1 | 11/2004 | Aasgaard | | |
| 2011/0020093 A1 * | 1/2011 | Busch | ................... | F16B 21/086 411/358 |

* cited by examiner

*Primary Examiner* — Gary Estremsky
(74) *Attorney, Agent, or Firm* — Winston Hsu; Scott Margo

(57) ABSTRACT

A fixing mechanism disclosed in the present invention includes a body, a contact portion and an airtight sealing component. The body has a hollow structure and a first end and a second end. The first end is opposite to the second end. The first end passes through an open hole formed on a first object to insert into a positioning portion disposed on a second object, and an outer surface of the body is engaged with an inner surface of the positioning portion in a linear contacting manner. The contact portion is disposed on the second end. The contact portion contacts against a side of the first object opposite to the second object when the body passes through the first object and the second object. The airtight sealing component is disposed on the second end to seal the hollow structure, to prevent external gas from flowing into the hollow structure.

9 Claims, 5 Drawing Sheets

FIXING MECHANISM

BACKGROUND OF THE INVENTION

1. Field of the Invention

The present invention relates to a fixing mechanism, and more particularly, to a fixing mechanism without screws and having advantages of low cost and great yield.

2. Description of the Prior Art

A screw and a nut are generally utilized to assemble objects in conventional fixing technique. For assembly of a first object and a second object, an open hole is formed on the first object, a positioning portion is disposed on the second object, and a bridging component (such as a boss) is installed on the positioning portion. The screw passes through the open hole on the first object, and rotatably inserts into the boss on the positioning portion. A thread structure is formed on an inner wall of the boss, so that the screw can be tightly engaged with the boss via the thread structure to constrain a relative movement between the first object and the second object. The conventional screw fixing technique has drawbacks of expensive manufacturing cost due to the screw and the bridging component, high-priced assembly cost of disposing the bridging component on the positioning portion, long working hours and low product yield.

SUMMARY OF THE INVENTION

The present invention provides a fixing mechanism without screws and having advantages of low cost and great yield for solving above drawbacks.

According to the claimed invention, a fixing mechanism for fixing a first object on a second object is disclosed. An open hole is formed on the first object, and a positioning portion is disposed on the second object. The fixing mechanism includes a body, a contact portion and an airtight sealing component. A hollow structure is disposed inside the body. The body includes a first end and a second end opposite to each other. The first end passes through the open hole to insert into the positioning portion, and an outer surface of the body is engaged with an inner surface of the positioning portion in a linear contacting manner. The contact portion is disposed on the second end. The contact portion contacts against a side of the first object opposite to the second object when the body passes through the first object and the second object. The airtight sealing component is disposed on the second end to seal the hollow structure, so as to prevent external gas from flowing into the hollow structure.

According to the claimed invention, the airtight sealing component is adapted to seal the hollow structure when the body inserts into the positioning portion.

According to the claimed invention, an outer diameter of the body is substantially equal to or greater than an inner diameter of the positioning portion.

According to the claimed invention, the fixing mechanism further includes an airtight buffering component disposed on the outer surface of the body and filled between the body and the positioning portion in a resilient deformable manner.

According to the claimed invention, an annular protruding portion is disposed on the outer surface of the body, and the airtight buffering component is disposed on the annular protruding portion.

According to the claimed invention, the fixing mechanism further includes an airtight isolating component located between the first object and the second object, and further disposed around the positioning portion.

According to the claimed invention, the body and the positioning portion respectively are straight-tubed structures or funnel-shaped structures. An upper dimension of the funnel-shaped structure is substantially greater than a low dimension of the funnel-shaped structure.

According to the claimed invention, the fixing mechanism further includes an exhausting module for exhausting gas inside the hollow structure when the hollow structure is sealed by the airtight sealing component.

The present invention does not have components with any thread structure (such as a screw and a nut). The fixing mechanism of the present invention forms the hermetically sealed space to generate assembly force for fixing the objects by the atmospheric pressure and the vacuum suction force. The present invention economizes amounts and expense of the screw and the boss, has advantages of rapid assembly hour, low manufacturing cost and great product yield.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
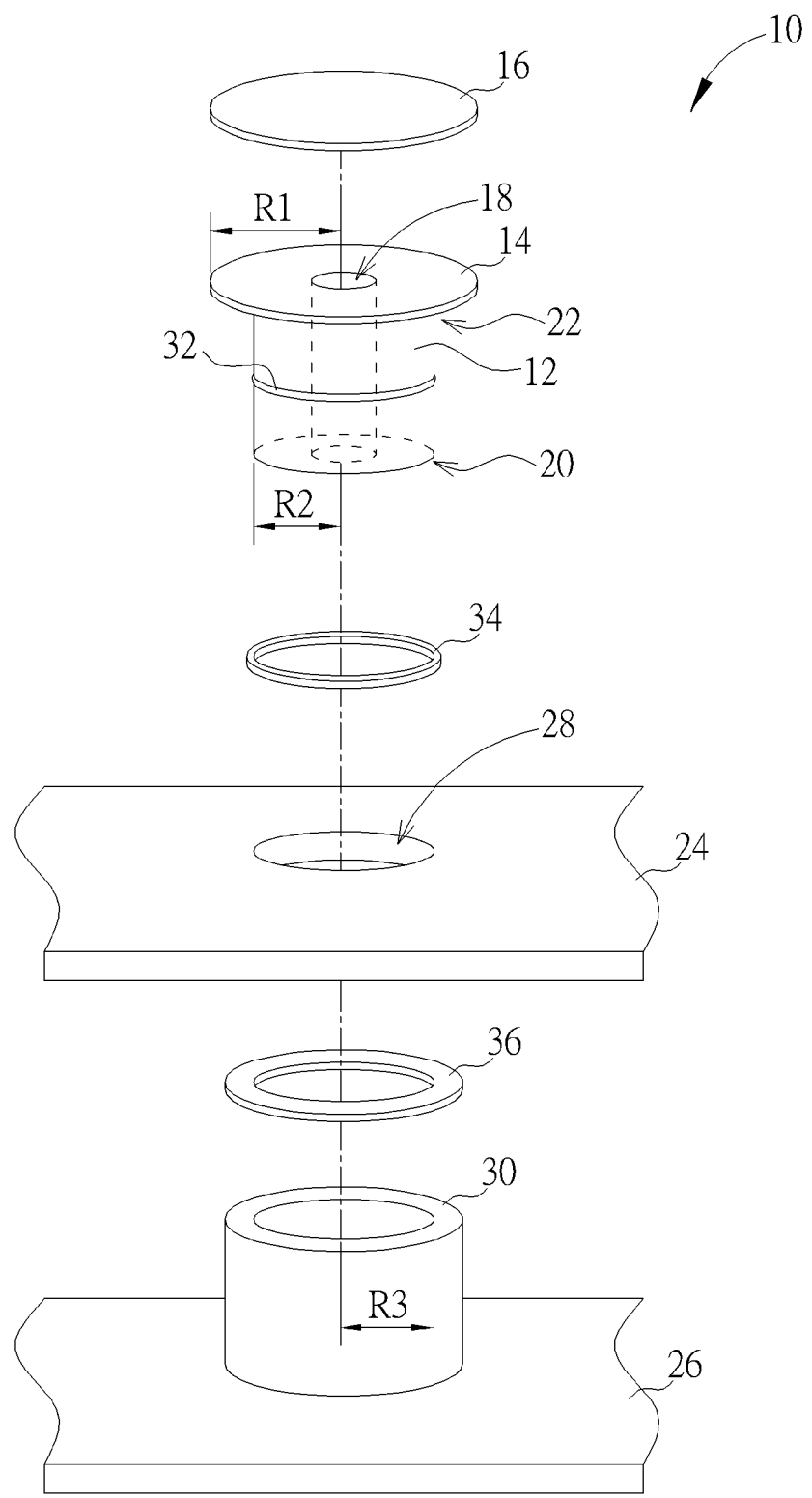
FIG. 1 is a diagram of a fixing mechanism according to an embodiment of the present invention.

Please refer to FIG. 1. FIG. 1 is a diagram of a fixing mechanism 10 according to an embodiment of the present invention. The fixing mechanism 10 can be utilized to fix objects without screws. The fixing mechanism 10 includes a body 12, a contact portion 14 and an airtight sealing component 16. An outer surface of the body 12 is flat and has no thread structure. The body 12 includes a hollow structure 18, and the hollow structure 18 can be formed by arbitrary shapes. The body 12 further includes a first end 20 and a second end 22 opposite to each other. Openings of the hollow structure 18 are respectively formed on the first end 20 and the second end 22, so the body 12 has a penetrating space. The contact portion 14 is disposed on the second end 22 of the body 12. Radial dimension R1 of the contact portion 14 is substantially greater than an outer diameter R2 of the body 12. The aright sealing component 16 is made of airtight material capable of isolating gas, such as rubber. The airtight sealing component 16 is disposed on the second end 22 of the body 12 for sealing the opening of the hollow structure 18 on the second end 22.

As shown in FIG. 1, the fixing mechanism 10 is utilized to fix a first object 24 on a second object 26. An open hole 28 is formed on the first object 24. The second object 26 includes a positioning portion 30. In this embodiment, the body 12 and the positioning portion 30 respectively are straight-tubed structures. Dimension of the body 12 is matched with dimensions of the open hole 28 and the positioning portion 30. For assembly of the first object 24 and the second object 26, the first end 20 of the body 12 passes through the open hole 28 on the first object 24 to insert into the positioning portion 30 of the second object 26. Because the outer diameter R2 of the body 12 is substantially equal to or greater than (which means not smaller than) an inner diameter R3 of the positioning portion 30, the outer surface of the body 12 can be engaged with an inner surface of the positioning portion 30 in a linear contacting manner, there is no gap formed between the body 12 and the positioning portion 30 for gas flowage.

As the body 12 inserts into the positioning portion 30, the contact portion 14 contacts against aside (which means an upper side) of the first object 24 opposite to the second object 26, so as to constrain a movement of the first object 24 relative to the second object 26. Then, the airtight sealing component 16 is disposed on the body 12 to seal the hollow structure 18. The airtight sealing component 16 is preferably adhered to the body 12. Method capable of assembling the airtight sealing component 16 with the body 12 in an airtight manner belongs to scope of the present invention, and a detailed description is omitted herein for simplicity. A hermetically sealed space is formed inside the hollow structure 18 by the airtight sealing component 16 and the linear contact between the body 12 and the positioning portion 30, to prevent external gas from flowing into the hollow structure 18. Thus, atmospheric pressure is applied to press the fixing mechanism 10 in the present invention, to firmly fix the first object 24 on the second object 26.

Besides, the body 12 further can include at least one annular protruding portion 32 disposed on the outer surface of the body 12 and adjacent to the first end 20. The annular protruding portion 32 is utilized to generate structural interference in the linear contacting manner between the body 12 and the positioning portion 30, to effectively prevent the gap from being formed. The annular protruding portion 32 is a selective unit, and an amount of the annular protruding portion 32 can be equal to one or more. The plurality of annular protruding portions 32 can be respectively adjacent to the first end 20 and the second end 22, so the body 12 is engaged with the positioning portion 30 and an inner wall of the open hole 28 on the first object 24 in the linear contacting manner via the annular protruding portions 32 located at different positions. The fixing mechanism 10 further can include at least one airtight buffering component 34 disposed on the outer surface of the body 12, and preferably covering the annular protruding portion 32. The airtight buffering component 34 is made of resilient deformable material, such as the rubber or sponge. The airtight buffering component 34 is filled between the body 12 and the positioning portion 30 in a resilient deformable manner, the annular protruding portion 32 can be engaged with the positioning portion 30 and the open hole 28 tightly via the airtight buffering component 34.

Figure 2:
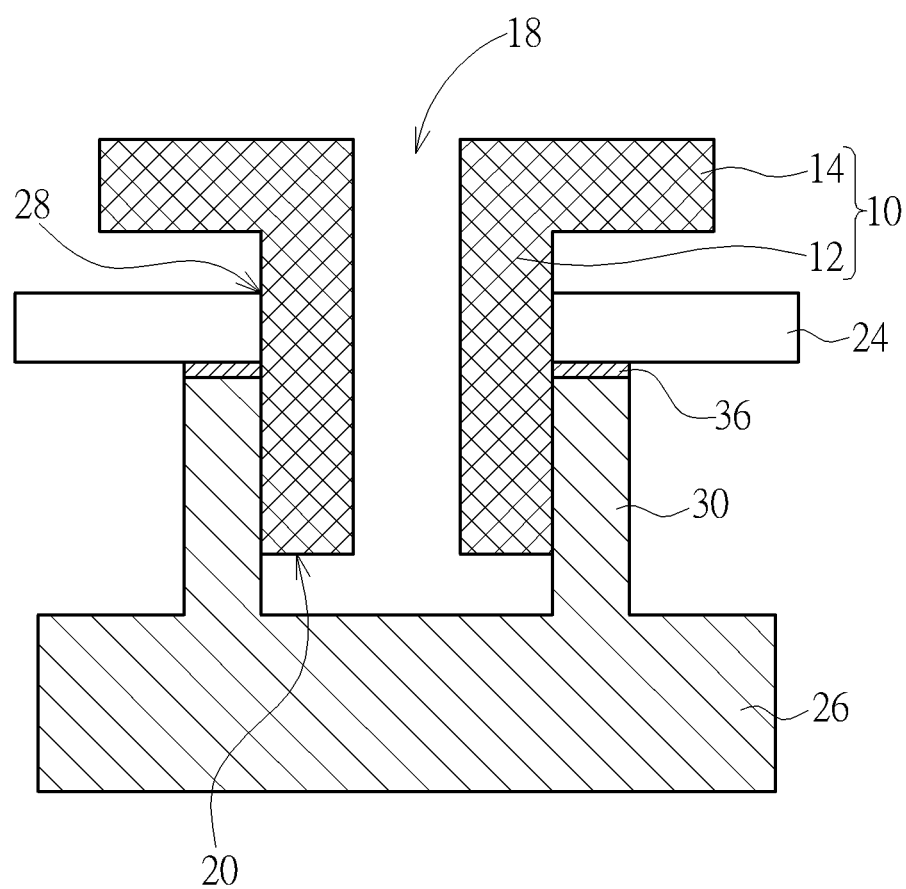
FIG. 2 to FIG. 4 respectively are sectional views of the fixing mechanism, a first object and a second object in different assembly modes according to the embodiment of the present invention.
Figure 3:
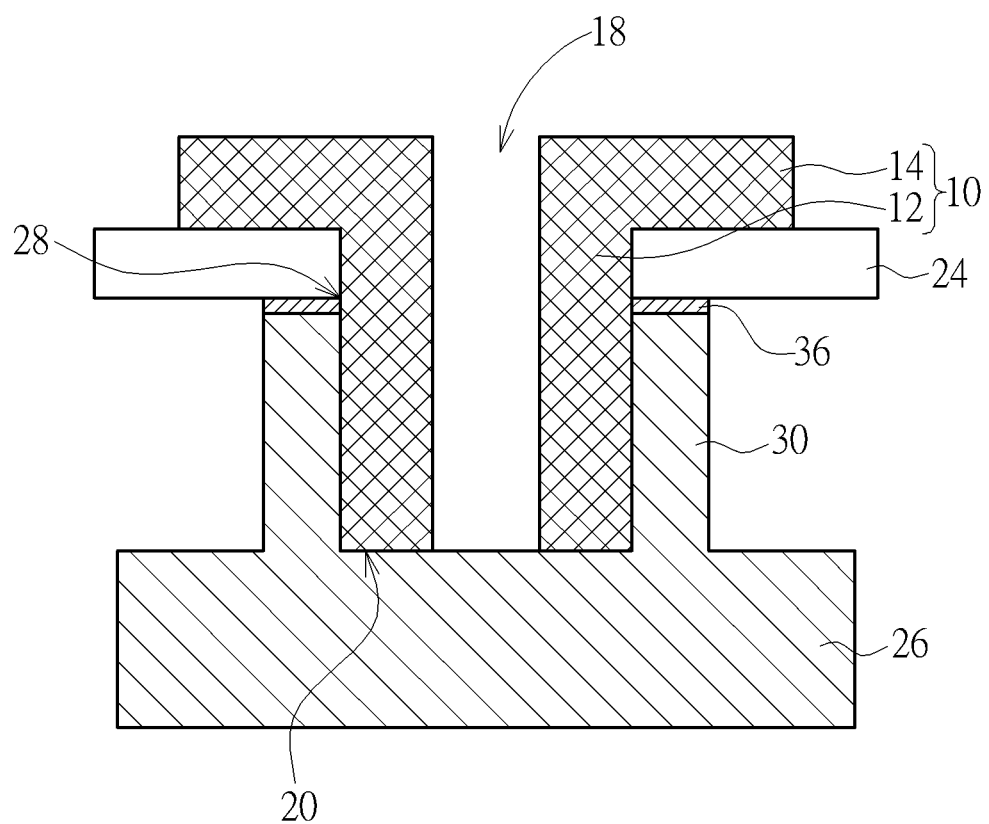
Figure 4:
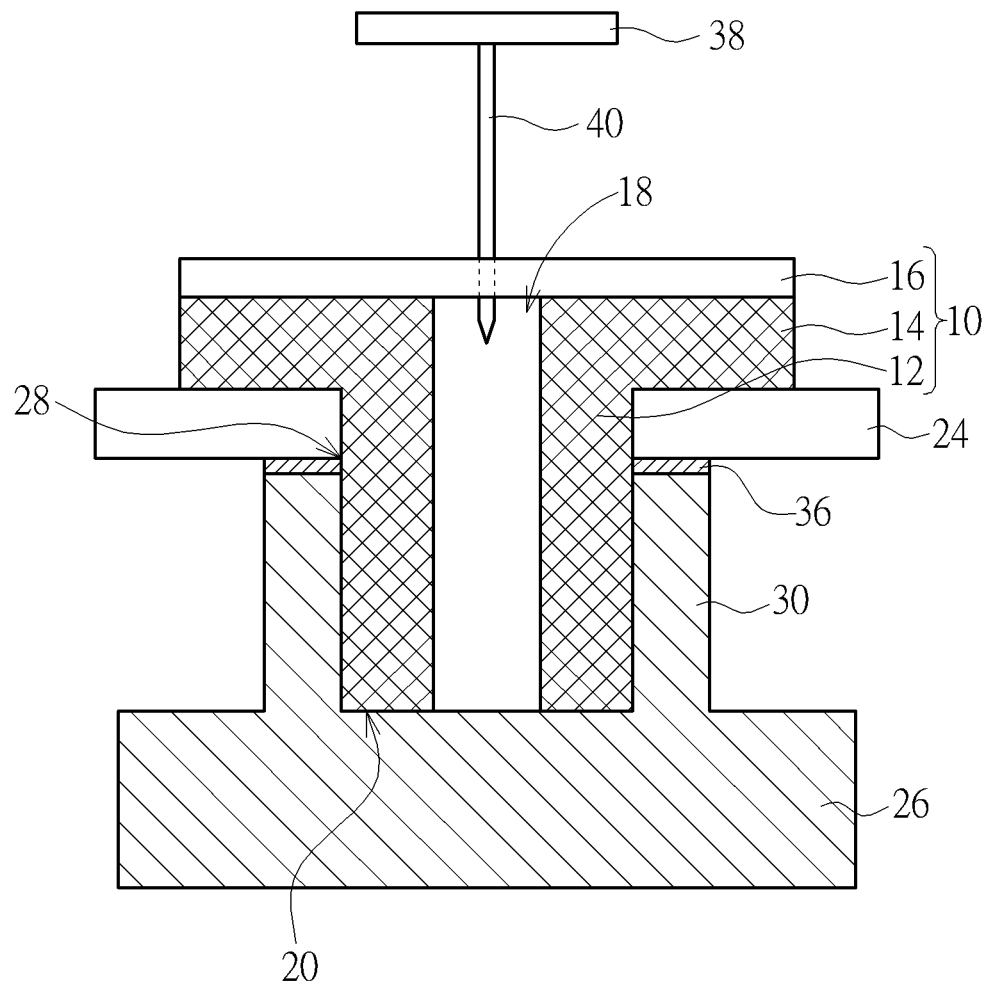

Please refer to FIG. 2 to FIG. 4. FIG. 2 to FIG. 4 respectively are sectional views of the fixing mechanism 10, the first object 24 and the second object 26 in different assembly modes according to the embodiment of the present invention. The annular protruding portion 32 and the airtight buffering component 34 are omitted herein for simplicity. As shown in FIG. 2, the first object 24 is put on the second object 26, and the open hole 28 aligns with the opening on the positioning portion 30. The body 12 of the fixing mechanism 10 passes through the open hole 28 to insert into the positioning portion 30, and the gas inside the positioning portion 30 is exhausted through the hollow structure 18. As shown in FIG. 3, the first end 20 of the body 12 contacts a bottom of the positioning portion 30, and the contact portion 14 contacts against the upper side of the first object 24 accordingly. As shown in FIG. 4, the airtight sealing component 16 is utilized to seal the upper opening on the hollow structure to prevent the external gas from flowing into the hollow structure 18. Due to theory of pressure balance, the atmospheric pressure can be applied to the fixing mechanism 10 to press the first object 24 on the second object 26.

The fixing mechanism 10 further can include an airtight isolating component 36 disposed around the positioning portion 30 before the first object 24 is put on the second object 26, as shown in FIG. 1 to FIG. 4. The airtight isolating component 36 is filled between the first object 24 and the second object 26 to prevent any gap from be formed. The airtight isolating component 36, the airtight sealing component 16 and the airtight buffering component 34 are utilized to engage the body 12 with the first object 24 and the second object 26 in the airtight manner. The fixing mechanism 10 further includes an exhausting module 38, as shown in FIG. 4. The exhausting module 38 is utilized to exhaust the gas inside the hollow structure 18, so as to generate vacuum suction force to fix the body 12 and the second object 26. An air needle 40 of the exhausting module 38 can pierce through the airtight sealing component 16 to exhaust the gas inside the hollow structure 18. The airtight sealing component 16 is made of resilient recoverable material. As the air needle 40 is pulled out of an aperture on the airtight sealing component 16, the aperture is automatically repaired by recovery function of the airtight sealing component 16. An external tool can be selectively utilized to coat airtight stuff on the aperture. Application of recovering the aperture on the airtight sealing component 16 is not limited to the above-mentioned embodiments. The air needle 40 further can insert into the hollow structure 18 to exhaust the gas through a joint between the airtight sealing component 16 and the body 12. Application of exhausting the gas inside the hollow structure 18 is not limited to the above-mentioned embodiments. The airtight sealing component 16 can be made of rigid material. The rigid airtight sealing component 16 is not easily deformed by pressure difference between inner space of the hollow structure 18 and ambient environment, to ensure that the fixing mechanism 10 can provide stable force to assemble the first object with the second object.

Figure 5:
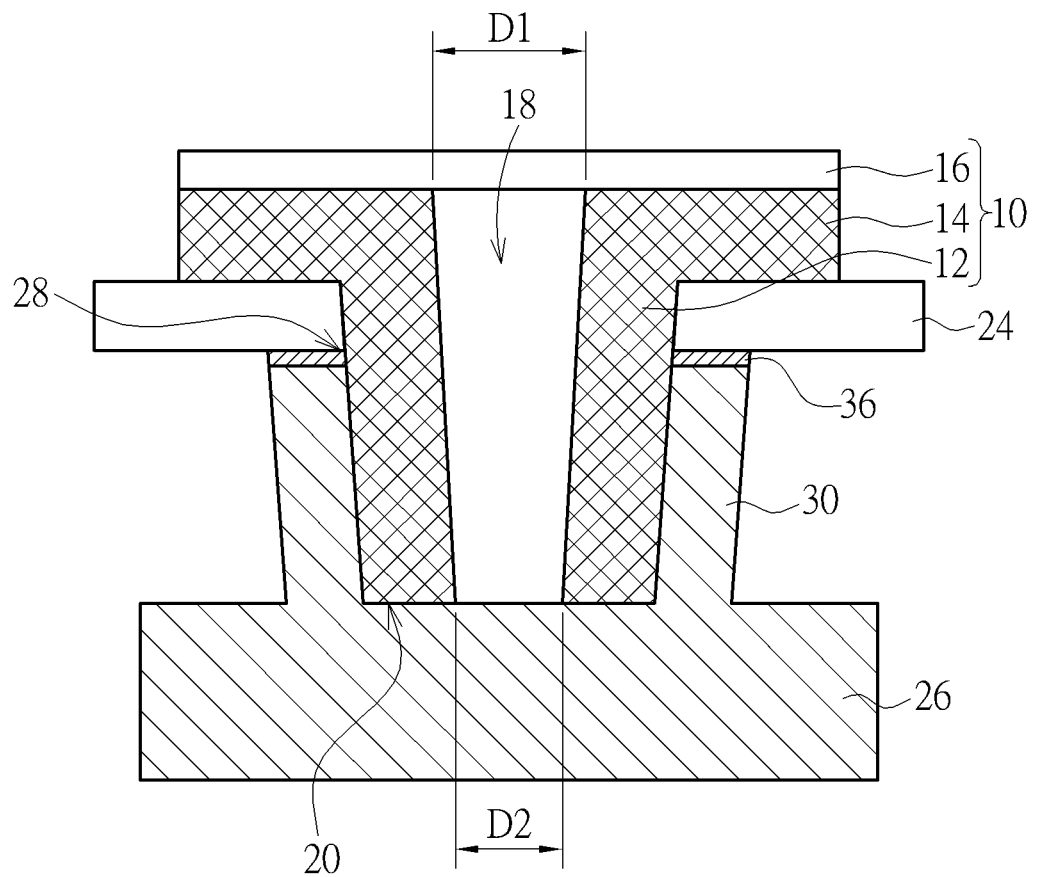
FIG. 5 is a sectional view of the fixing mechanism and the second object according to the other embodiment of the present invention.

Please refer to FIG. 5. FIG. 5 is a sectional view of the fixing mechanism 10 and the second object 26 according to the other embodiment of the present invention. In this embodiment, the body 12 and the positioning portion 30 can respectively be funnel-shaped structures with similar dimension scale. An upper dimension D1 of the funnel-shaped structure is substantially greater than a low dimension D2 of the funnel-shaped structure. The body 12 can be tightly engaged inside the positioning portion 30 in the linear contacting manner via the funnel-shaped structure. It should be mentioned that the body 12, which inserts into the hollow structure 18, can directly contact or suspend above the bottom of the positioning portion 30. As the fixing mechanism 10 utilizes the airtight sealing component 16 to stably form the hermetically sealed space between the body 12 and the positioning portion 30, the atmospheric pressure can be applied to the fixing mechanism 10 for pressing the first object 24 and the second object 26.

Comparing to the prior art, the present invention does not have components with any thread structure (such as a screw and a nut). The fixing mechanism of the present invention forms the hermetically sealed space to generate assembly force for fixing the objects by the atmospheric pressure and the vacuum suction force. The present invention economizes amounts and expense of the screw and the boss, has advantages of rapid assembly hour, low manufacturing cost and great product yield.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing mechanism fixing a first object on a second object, an open hole being formed on the first object, a positioning portion being a sunken structure disposed on the second object, the fixing mechanism comprising:
   a body with a hollow structure, the hollow structure comprising a first opening and a second opening opposite to each other, the body comprising a first end and a second end opposite to each other, the first end passing through the open hole to insert into the positioning portion, and an outer surface of the body being engaged with an inner surface of the positioning portion in a linear contacting manner to seal the first opening by the positioning portion;
   a contact portion disposed on the second end, the contact portion contacting against a side of the first object opposite to the second object when the body passes through the first object and the second object; and
   an airtight sealing component disposed on the contact portion to seal the second opening, so as to prevent external gas from flowing into an enclosed space enclosed by the hollow structure, the airtight sealing component and the positioning portion.

2. The fixing mechanism of claim 1, wherein the airtight sealing component is adapted to seal the hollow structure when the body inserts into the positioning portion.

3. The fixing mechanism of claim 1, wherein an outer diameter of the body is substantially equal to or greater than an inner diameter of the positioning portion.

4. The fixing mechanism of claim 1, further comprising:
   an airtight buffering component disposed on the outer surface of the body and filled between the body and the positioning portion in a resilient deformable manner.

5. The fixing mechanism of claim 4, wherein an annular protruding portion is disposed on the outer surface of the body, and the airtight buffering component is disposed on the annular protruding portion.

6. The fixing mechanism of claim 1, further comprising:
   an airtight isolating component located between the first object and the second object, and further disposed around the positioning portion.

7. The fixing mechanism of claim 1, wherein the body and the positioning portion respectively are straight-tubed structures.

8. The fixing mechanism of claim 1, wherein the body and the positioning portion respectively are funnel-shaped structures, an upper dimension of the funnel-shaped structure is substantially greater than a low dimension of the funnel-shaped structure.

9. The fixing mechanism of claim 1, further comprising:
   an exhausting module for exhausting gas inside the hollow structure when the hollow structure is sealed by the airtight sealing component.

\* \* \* \* \*